US010773240B2

(12) United States Patent
Ghiasvand et al.

(10) Patent No.: US 10,773,240 B2
(45) Date of Patent: Sep. 15, 2020

(54) MODIFIED COTTON FABRIC FOR SOLID-PHASE EXTRACTION AND FABRICATION METHOD

(71) Applicants: Ali Reza Ghiasvand, Khoramabad (IR); Mina Behfar, Behbahan (IR); Fatemeh Yazdankhah, Khoramabad (IR)

(72) Inventors: Ali Reza Ghiasvand, Khoramabad (IR); Mina Behfar, Behbahan (IR); Fatemeh Yazdankhah, Khoramabad (IR)

( * ) Notice: Subject to any disclaimer, the term of this patent is extended or adjusted under 35 U.S.C. 154(b) by 46 days.

(21) Appl. No.: 16/140,564

(22) Filed: Sep. 25, 2018

(65) Prior Publication Data

US 2019/0091658 A1    Mar. 28, 2019

Related U.S. Application Data

(60) Provisional application No. 62/566,535, filed on Oct. 2, 2017.

(51) Int. Cl.
   *B01J 20/28*   (2006.01)
   *B01J 20/32*   (2006.01)
   (Continued)

(52) U.S. Cl.
   CPC ........... *B01J 20/283* (2013.01); *B01J 20/103* (2013.01); *B01J 20/28083* (2013.01);
   (Continued)

(58) Field of Classification Search
   CPC .................. B01J 20/283; B01J 20/28083; B01J 20/3206; B01J 20/103; B01J 2220/80;
   (Continued)

(56) References Cited

U.S. PATENT DOCUMENTS 5,599,445 A  *  2/1997  Betz ................. B01D 15/08
                                                    210/198.2
7,059,206 B1 *  6/2006  Kingston ............... G01N 1/12
                                                    73/64.56
(Continued)

OTHER PUBLICATIONS

Lena B. Borklund et al, "Determination of copper speciation in freshwater samples through SPE-spectrophotometry", Analytica Chimica Acta, vol. 343, pp. 259-266, published 1997 (Year: 1997).*
(Continued)

*Primary Examiner* — Joseph W Drodge
(74) *Attorney, Agent, or Firm* — Bajwa IP Law Firm; Harris Zaheer Bajwa

(57) ABSTRACT

A method for solid-phase extraction is disclosed. The method includes fabricating a solid-phase extraction medium by incorporating a plurality of modified mesoporous silica particles within pores of a cotton fabric matrix, putting the solid-phase extraction medium in contact with a fluid containing metal ions including one of immersing the solid-phase extraction medium in the fluid containing metal ions or passing the fluid containing metal ions through the solid-phase extraction medium by continuously circulating the fluid through the solid-phase extraction medium, and extracting the metal ions from the fluid by adsorbing the metal ions onto the solid-phase extraction medium responsive to a contact between the solid-phase extraction medium and the fluid containing metal ions.

12 Claims, 17 Drawing Sheets

(51) Int. Cl.
*B01J 20/10* (2006.01)
*G01N 1/40* (2006.01)
*B01D 15/26* (2006.01)
*B01J 20/283* (2006.01)
*B01J 20/281* (2006.01)
*G01N 30/00* (2006.01)
*G01N 30/06* (2006.01)

(52) U.S. Cl.
CPC .......... *B01J 20/3206* (2013.01); *G01N 1/405* (2013.01); *G01N 30/48* (2013.01); *B01D 15/26* (2013.01); *B01J 2220/46* (2013.01); *B01J 2220/4825* (2013.01); *B01J 2220/80* (2013.01); *G01N 2030/009* (2013.01); *G01N 2030/062* (2013.01)

(58) Field of Classification Search
CPC ............ B01J 2220/4825; B01J 2220/46; B01J 20/28016; B01J 20/28023; B01J 20/28026; B01J 20/28028; B01J 20/288; B01J 20/3085; B01J 20/3242; B01J 20/48; B01J 2220/4831; B01J 2220/82; B01J 2220/86; G01N 30/48; G01N 1/405; G01N 2030/062; G01N 2030/009; G01N 30/482; G01N 30/50; G01N 2030/484; G01N 33/20; G01N 33/202; G01N 33/2028; B01D 15/26; B01D 11/02; B01D 11/028; B01D 11/0284; B01D 11/0288; B01D 15/14; B01D 15/20; B01D 15/206; B01D 15/22; B01D 15/265
USPC ...... 210/198.2, 263, 500.21, 500.25, 500.26, 210/500.27, 500.29, 500.3, 502.1, 210/503–509, 511, 634, 638, 656; 502/401, 405, 407, 411, 414, 417; 436/73, 79, 177, 178
See application file for complete search history.

(56) References Cited

U.S. PATENT DOCUMENTS

| | | | | |
|---|---|---|---|---|
| 9,933,196 | B2* | 4/2018 | Ghiasvand | F25D 3/10 |
| 10,191,019 | B2* | 1/2019 | Ghiasvand | G01N 30/482 |
| 10,258,963 | B2* | 4/2019 | Ghiasvand | B01J 20/28007 |
| 10,315,934 | B2* | 6/2019 | Ghiasvand | G01N 1/405 |
| 10,345,201 | B2* | 7/2019 | Ghiasvand | G01N 1/405 |
| 10,514,365 | B2* | 12/2019 | Ghiasvand | B01J 20/262 |
| 2006/0247362 | A1* | 11/2006 | Shah | B01J 20/26 524/494 |
| 2007/0196833 | A1* | 8/2007 | Gjerde | B01L 3/5025 435/6.12 |
| 2011/0220575 | A1* | 9/2011 | Deorkar | B01J 20/3253 210/656 |
| 2014/0306148 | A1* | 10/2014 | Kolomitsyn | B01J 20/20 252/175 |
| 2015/0233655 | A1* | 8/2015 | Ghiasvand | F25D 3/10 165/61 |

OTHER PUBLICATIONS

Mohammad Faraji et al, "Application of cotton as a solid phase extraction sorbent for on-line preconcentration of copper in water samples prior to inductively coupled plasma optical emission spectrometry determination", Journal of Hazardous Materials, vol. 166, pp. 1383-1388, 2009. (Year: 2009).*

Muquing Yu et al, "Systematic studies on adsorption of 11 trace heavy metals on thiol cotton fiber", Analytica Chimica Acta, vol. 428, pp. 209-211, 2011. (Year: 2011).*

Ali Rehber Turker, "Separation, Preconcentration and Speciation of Metal Ions by Solid Phase Extraction", Journal of Separation & Purification Reviews, vol. 41, 2012, Issue 3, pp. 1-56. (Year: 2012).*

Boguslaw Buszewski et al, "Past, Present, and Future of Solid Phase Extraction", Critical Reviews in Analytical Chemistry, vol. 42, pp. 198-213, 2012. (Year: 2012).*

Mahmoud Heidari et al, "Application of solid phase microextraction and needle trap device with silica composite of carbon nanotubes for determination of perchloroethylene in laboratory and field", Analytica Chimica Acta, vol. 918, pp. 43-49, published online Mar. 10, 2016. (Year: 2016).*

Mehdi Karimi et al, "Application of Deep Eutectic Modified Cotton as a Sorbent for Online Solid Phase Extraction and Determination of Trace Amounts of Copper and Nickel in Water and Biological Samples", Biol Trace Elem Res, vol. 176, pp. 207-215, published online Aug. 10, 2016. (Year: 2016).*

Nahid Heidari et al, "Amino-silica/graphene oxide nanocomposite coated cotton as an efficient sorbent for needle trap device", Analytica Chimica, vol. 975, pp. 11-16, published online Apr. 26, 2017. (Year: 2017).*

Fabio R. P. Rocha, "Solid-phase extractions in flow analysis", Anais da Academia de Ciencias, vol. 90, Supplement 1, pp. 803-824. (Year: 2018).*

Maria Josecardador et al., Cotton-supported graphene functionalized with aminosilica nanoparticles as a versatile high-performance extraction sorbent for trace organic analysis, Journal of Chromatography A, Apr. 4, 2014, pp. 43-51, vol. 1336.

Álisson Comes Paulino et al, Chemically modified natural cotton fiber: a low-cost biosorbent for the removal of the Cu(II), Zn(II), Cd(II), and Pb(II) from natural water, Desalination and Water Treatment 2014, pp. 4223-4233, vol. 52.

Mercedes Roldán-Pijuán et al., Stir fabric phase sorptive extraction for the determination of triazine herbicides in environmental waters by liquid chromatography, Journal of Chromatography A, Jan. 9, 2015, pp. 35-45, vol. 1376.

Abuzar Kabir et al., Fabric Phase Sorptive Extraction Explained, Separations 2017, pp. 1-21, vol. 4 (21).

* cited by examiner

906

MODIFIED COTTON FABRIC FOR SOLID-PHASE EXTRACTION AND FABRICATION METHOD

CROSS-REFERENCE TO RELATED APPLICATION

This application claims the benefit of priority from pending U.S. Provisional Patent Application Ser. No. 62/566,535 filed on Oct. 2, 2017, and entitled "MODIFIED COTTON FABRIC AS A SOLID PHASE EXTRACTION DISK AND FABRICATION METHOD", which is incorporated herein by reference in its entirety.

SPONSORSHIP STATEMENT

This application has been sponsored by Iran Patent Office, which does not have any rights in this application.

TECHNICAL FIELD

The present disclosure generally relates to solid-phase extraction (SPE), and particularly, to solid-phase extraction disks, and more particularly, to modified cotton fabric solid-phase extraction disks and fabrication thereof.

BACKGROUND

Heavy metals are potentially toxic to living organisms. Heavy metals and metalloids that are not necessary for metabolic activities, may be toxic to the cells even at quite low concentrations. Environmental exposure to heavy metal ions is a well-known risk factor for the health of human, plants, and animals. Therefore, effective separation of heavy metals from different matrices and their consequent preconcentration for sensitive determination is an important issue. Direct determination of heavy metal ions which are present in real matrices such as natural water, wastewater, plant, soil, and sediment are not possible with general analytical techniques such as atomic absorption spectrometry (AAS) and inductively coupled plasma-atomic emission spectrometry (ICP-AES), due to the matrix effect of foreign ions and low concentration of the analytes. Therefore, it is necessary to separate/extract and preconcentrate the trace elements, before their analysis, to remove interferes and to enhance the concentration.

Solid-phase extraction (SPE) is one of the most powerful techniques for separation and enrichment of various inorganic and organic analytes that has been used for separation of heavy metals. The most important factor of SPE is the use of a stable phase, including features such as porosity and high contact surface, reversible absorption, high purity, good chemical stability, and high recovery rates. Moreover, high selectivity and cost-efficiency are two important challenges for an adsorbing medium that may be used in a SPE process. In addition, SPE technique should be applicable for high rates of fluids and samples to be processed; thereby, making SPE usable widely in different industries.

Hence, considering the widespread application of the SPE method, there is a need for development of efficient, cost-effective, flexible, and green usable phases for heavy metal ions in SPE field. Additionally, there is a need for a SPE method that may be used continuously to separate heavy metals from fluids with high flow rates and volumes with high sorption efficiencies. Moreover, there is a need for a SPE method and apparatus with high selectivity for different metals.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary method for solid-phase extraction. The method may include fabricating a solid-phase extraction medium by incorporating a plurality of modified mesoporous silica particles within pores of a cotton fabric matrix, putting the solid-phase extraction medium in contact with a fluid containing metal ions, and extracting the metal ions from the fluid by adsorbing the metal ions onto the solid-phase extraction medium responsive to the contact between the solid-phase extraction medium and the fluid containing metal ions. Putting the solid-phase extraction medium in contact with the fluid containing metal ions may include immersing the solid-phase extraction medium in the fluid containing metal ions or passing the fluid containing metal ions through the solid-phase extraction medium by continuously circulating the fluid through the solid-phase extraction medium.

In an exemplary implementation, fabricating the solid-phase extraction medium by incorporating the plurality of modified mesoporous silica particles within pores of the cotton fabric matrix may include attaching a plurality of mesoporous silica particles modified or functionalized with a hydroxyl group and an imine group into the cotton fabric matrix comprising a porous matrix. In some exemplary embodiments, attaching the plurality of mesoporous silica particles modified with the hydroxyl group and the imine group into the cotton fabric matrix may include chemically bonding of the plurality of mesoporous silica particles modified with the hydroxyl group and the imine group into pores of the porous matrix.

In an exemplary implementation, fabricating the solid-phase extraction medium may include synthesizing a plurality of mesoporous silica particles, forming a plurality of first-modified mesoporous silica particles by functionalizing the plurality of mesoporous silica particles with an amine group using a first modifying agent, forming a first-functionalized cotton fabric by attaching the plurality of first-modified mesoporous silica particles into a piece of oxidized cotton fabric, and forming a second-functionalized cotton fabric by adding a second modifying agent to the first-functionalized cotton fabric. The second-functionalized cotton fabric may include the plurality of modified mesoporous silica particles functionalized with a hydroxyl group and an imine group and incorporated in cotton fabric matrix.

In an exemplary implementation, synthesizing the plurality of mesoporous silica particles may include synthesizing the plurality of mesoporous silica particles using hydrothermal technique.

In an exemplary implementation, forming the plurality of first-modified mesoporous silica particles may include forming a mixture by mixing the plurality of mesoporous silica particles with a solution of the first modifying agent, forming a solid material in the mixture including the first-modified mesoporous silica particle by stirring the mixture for a time period of 24 hours or more, separating the solid material from the mixture by filtering the mixture, washing the separated solid material, and drying the washed solid material.

In an exemplary implementation, forming the first-functionalized cotton fabric by attaching the plurality of first-modified mesoporous silica particles into the piece of oxidized cotton fabric ma include forming the piece of oxidized cotton fabric by oxidizing a piece of cotton fabric, immersing the piece of oxidized cotton fabric in a suspension comprising the plurality of first-modified mesoporous silica particles, and sonicating the suspension including the piece of oxidized cotton fabric and the plurality of first-modified mesoporous silica particles by placing the suspension in an ultrasonic tank.

In an exemplary implementation, forming the second-functionalized cotton fabric by adding the second modifying agent to the first-functionalized cotton fabric may include immersing the first-functionalized cotton fabric in a solution of the second modifying agent for at least 24 hours.

In an exemplary implementation, passing the fluid containing metal ions through the solid-phase extraction medium by continuously circulating the fluid through the solid-phase extraction medium may include placing the solid-phase extraction medium inside a columnar housing, which may include a tubular inlet at top of the columnar housing and a tubular outlet at bottom of the columnar housing. Passing the fluid containing metal ions through the solid-phase extraction medium may further include connecting the tubular inlet of the columnar housing to an outlet of a circulating pump, where a needle may be connected to an inlet of the circulating pump. Furthermore, passing the fluid containing metal ions through the solid-phase extraction medium may include putting a free tip of the tubular outlet and a free tip of the needle inside the fluid containing metal ions, and circulating the fluid containing metal ions through the columnar housing and the needle using the circulating pump. In an exemplary embodiment, circulating the fluid containing metal ions through the columnar housing and the needle using the circulating pump may include sucking the fluid containing metal ions through the needle utilizing the circulating pump, and pumping the fluid containing metal ions into the tubular inlet of the columnar housing utilizing the circulating pump.

In an exemplary implementation, exemplary method for solid-phase extraction may further include separating the metal ions from the solid-phase extraction medium that may include dissolving the metal ions in an eluting agent by passing the eluting agent through the solid-phase extraction medium. Additionally, exemplary method for solid-phase extraction may further include measuring the amount of the metal ions by analyzing the eluting agent using a graphite furnace atomic absorption spectrophotometer.

In an exemplary embodiment, the metal ions may include at least one of Iron (Fe), Copper (Cu), Zinc (Zn), Cobalt (Co), Chromium (Cr), Nickel (Ni), or combinations thereof.

In another aspect, the present disclosure describes an exemplary apparatus for solid-phase extraction. The exemplary apparatus may include a solid-phase extraction medium and a columnar housing including a tubular inlet at the top and a tubular outlet at the bottom for fluid flow. The solid-phase extraction medium may be placed inside the columnar housing. The solid-phase extraction medium may include a piece of cotton fabric with a porous matrix, and a plurality of mesoporous silica particles modified with a hydroxyl group and an imine group forming the plurality of modified mesoporous silica particles. The plurality of modified mesoporous silica particles may chemically bonded into pores of the porous matrix. The solid-phase extraction medium may be configured to adsorb a metal ion from a fluid containing the metal ion passing through the columnar housing by a chemical bonding between the metal ion and the solid-phase extraction medium.

In an exemplary implementation, the exemplary apparatus may further include a pre-filter placed above the solid-phase extraction medium inside the columnar housing. The pre-filter may be configured to at least one of filter a fluid passing through the columnar housing, filter a highly viscous solution passing through the columnar housing, remove large particulates from a suspension passing through the columnar housing, and combinations thereof.

In an exemplary implementation, the exemplary apparatus may further include a supporting member that may be placed directly beneath the solid-phase extraction medium inside the columnar housing.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
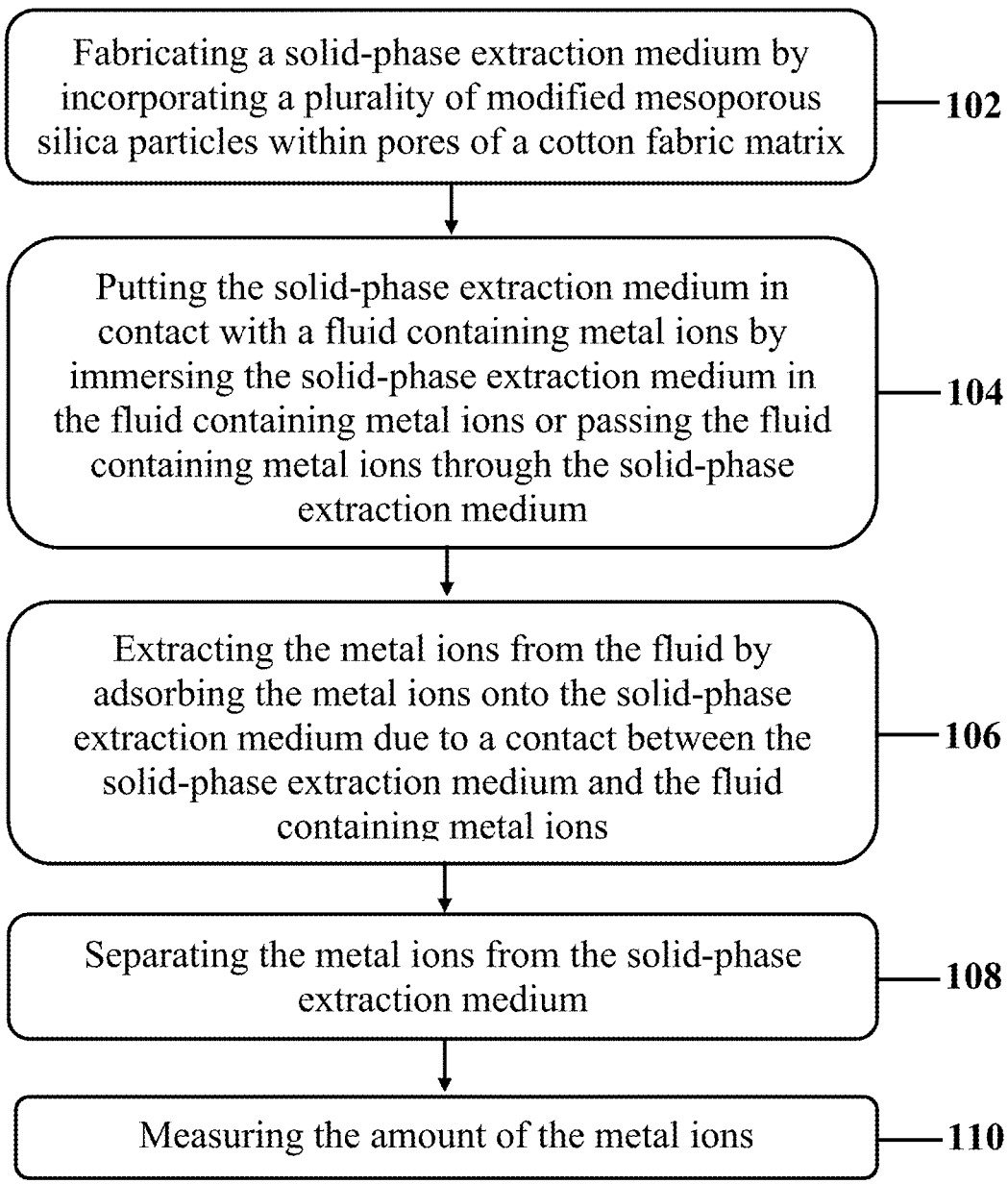
FIG. 1 illustrates an exemplary method for solid-phase extraction (SPE), consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Various techniques have been developed to separate and determine the amount of heavy metal ions in different samples such as differential pulse anodic stripping voltammetry (DPASV), switchable-solvent based on liquid-phase microextraction (SS-LPME), dispersive liquid-liquid microextraction (DLLME), supported liquid-membrane extraction (LME), emulsion liquid-membrane extraction (ELM), homogeneous liquid-liquid extraction, solid-phase extraction (SPE), and electrochemical sensors.

Among developed techniques for extracting heavy metal from water or other samples, SPE technique has become known as one of the most powerful tools for separation and enrichment of various inorganic and organic analytes. Some of the advantages of SPE over other techniques may include stability and reusability of the solid phase, reach of high preconcentration factors, easiness of separation and enrichment under dynamic conditions, no need for organic solvents, and minimal costs due to low consumption of reagents.

SPE may be conducted on three different configurations including, cartridge, membrane disk, and disk-cartridge. There are various commercial SPE disks for analysis of heavy metals in different matrices. However, commercial SPE disks do not usually have adequate selectivity and efficiency due to their similar and non-selective interactions with all type of metals. Transitional silica particles and organic polymers are adsorbents that are mostly used as the sorbent in SPE, and each one may be suitable for the extraction of a group or a small number of compounds. Nowadays, only a few companies in the world are manufacturing and distributing SPE tools. Therefore, due to exclusivity of the products these SPE tools have remarkably high prices.

Herein, an exemplary SPE method and exemplary apparatus are disclosed to overcome the above shortcomings of SPE technique. The following disclosure presents an improved and cost-effective technique for the detection, measurement, and/or extraction of heavy metals from a fluid. This further includes a disclosure related to the design, production, and modification of an exemplary SPE apparatus including a type of SPE disk that may include a modified cotton fabric. In addition, an exemplary method for fabricating exemplary SPE medium and apparatus is described. Disclosed exemplary system and apparatus may require a smaller amount of fluid as sample size, and fewer materials, relative to conventional systems.

Exemplary SPE medium (disk) may be used as a flexible and durable handmade SPE disk that may be utilized as an appropriate alternative for commercial SPE disks. Exemplary SPE medium (disk) may include modified mesoporous silica particles with suitable functional groups that may be attached to pores of a cotton fabric matrix with effective chemical interaction between them; thereby, providing a SPE disk surface that may effectively and selectively trap and/or extract various analytes, such as heavy metals.

As used herein the term "heavy metals" refers generally to metals with relatively high densities, atomic weights, or atomic numbers. In one exemplary embodiment, a heavy metal may be defined on the basis of density, whereas in physics the distinguishing criterion might be atomic number. In another exemplary embodiment, heavy metals may be known based on their chemical behavior. For example, some heavy metals may be either essential nutrients (typically iron, cobalt, and zinc), or relatively harmless (such as ruthenium, silver, and indium), but may be toxic in larger amounts or certain forms. Other heavy metals, such as cadmium, mercury, and lead, may be highly poisonous. Potential sources of heavy metal poisoning include mining, tailings, industrial wastes, agricultural runoff, occupational exposure, paints and treated timber.

In an exemplary embodiment, utilizing exemplary methods here, FIG. 1 shows an exemplary implementation of method 100 for solid-phase extraction, consistent with one or more exemplary embodiments of the present disclosure. Exemplary method 100 may include fabricating a solid-phase extraction medium by incorporating a plurality of modified mesoporous silica particles within pores of a cotton fabric matrix (step 102), putting the solid-phase extraction medium in contact with a fluid containing metal ions (step 104), and extracting the metal ions from the fluid by adsorbing the metal ions onto the solid-phase extraction medium responsive to the contact between the solid-phase extraction medium and the fluid containing metal ions (step 106). In exemplary embodiments, as describe in further details below, putting the solid-phase extraction medium in contact with a fluid containing metal ions (step 104) may include immersing the solid-phase extraction medium in the fluid containing metal ions or passing the fluid containing metal ions through the solid-phase extraction medium by continuously circulating the fluid through the solid-phase extraction medium.

Additionally, exemplary method 100 may further include separating the metal ions from the solid-phase extraction medium (step 108), and measuring the amount of the metal ions (step 110).

In detail, step 102 may include fabricating a solid-phase extraction medium by incorporating a plurality of modified mesoporous silica particles within pores of a cotton fabric matrix. In an exemplary embodiment, fabricating the solid-phase extraction medium by incorporating the plurality of modified mesoporous silica particles within pores of the cotton fabric matrix may include attaching a plurality of mesoporous silica particles modified or functionalized with a hydroxyl group and an imine group into the cotton fabric matrix comprising a porous matrix. In some exemplary embodiments, attaching the plurality of mesoporous silica particles modified with the hydroxyl group and the imine group into the cotton fabric matrix may include chemically bonding of the plurality of mesoporous silica particles modified with the hydroxyl group and the imine group into pores of the porous matrix.

Figure 2A:
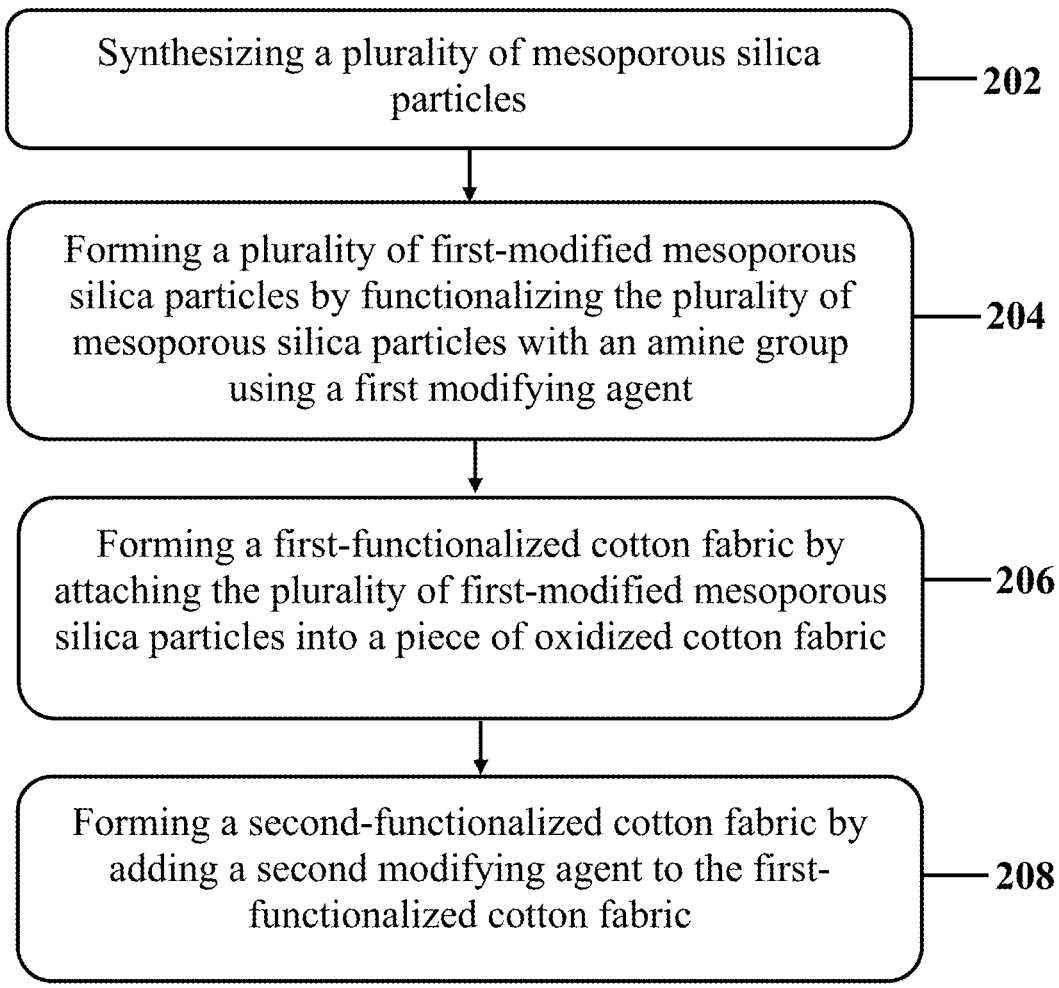
FIG. 2A illustrates an exemplary process of fabricating the solid-phase extraction medium, consistent with one or more exemplary embodiments of the present disclosure.

In details, FIG. 2A shows an exemplary implementation process of step 102 for fabricating the solid-phase extraction medium, consistent with one or more exemplary embodiments of the present disclosure. In an exemplary embodiment, the solid-phase extraction medium may include a solid-phase extraction disk.

Referring to FIG. 2A, fabrication of the solid-phase extraction medium may include synthesizing a plurality of mesoporous silica particles (step 202), forming a plurality of first-modified mesoporous silica particles by functionalizing the plurality of mesoporous silica particles with an amine group using a first modifying agent (step 204), forming a first-functionalized cotton fabric by attaching the plurality of first-modified mesoporous silica particles into a piece of oxidized cotton fabric (step 206), and forming a second-functionalized cotton fabric by mixing the first-functionalized cotton fabric with a second modifying agent (step 208). The second-functionalized cotton fabric may include the plurality of modified mesoporous silica particles that may be functionalized with a hydroxyl group and an imine group and incorporated in cotton fabric matrix.

Step 202 may include synthesizing the plurality of mesoporous silica particles. The plurality of mesoporous silica particles may be synthesized via a hydrothermal technique. In an exemplary embodiment, the plurality of mesoporous silica particles may include a plurality of Santa Barbara Amorphous (SBA-15) particles or a plurality of Mobil Composition of Matter No. 41 (MCM-41) particles.

Step 204 may include forming a plurality of first-modified mesoporous silica particles by functionalizing the plurality of mesoporous silica particles with an amine group using a first modifying agent. In an exemplary embodiment, the amine group may include a $NH_2$ group.

Figure 3A:
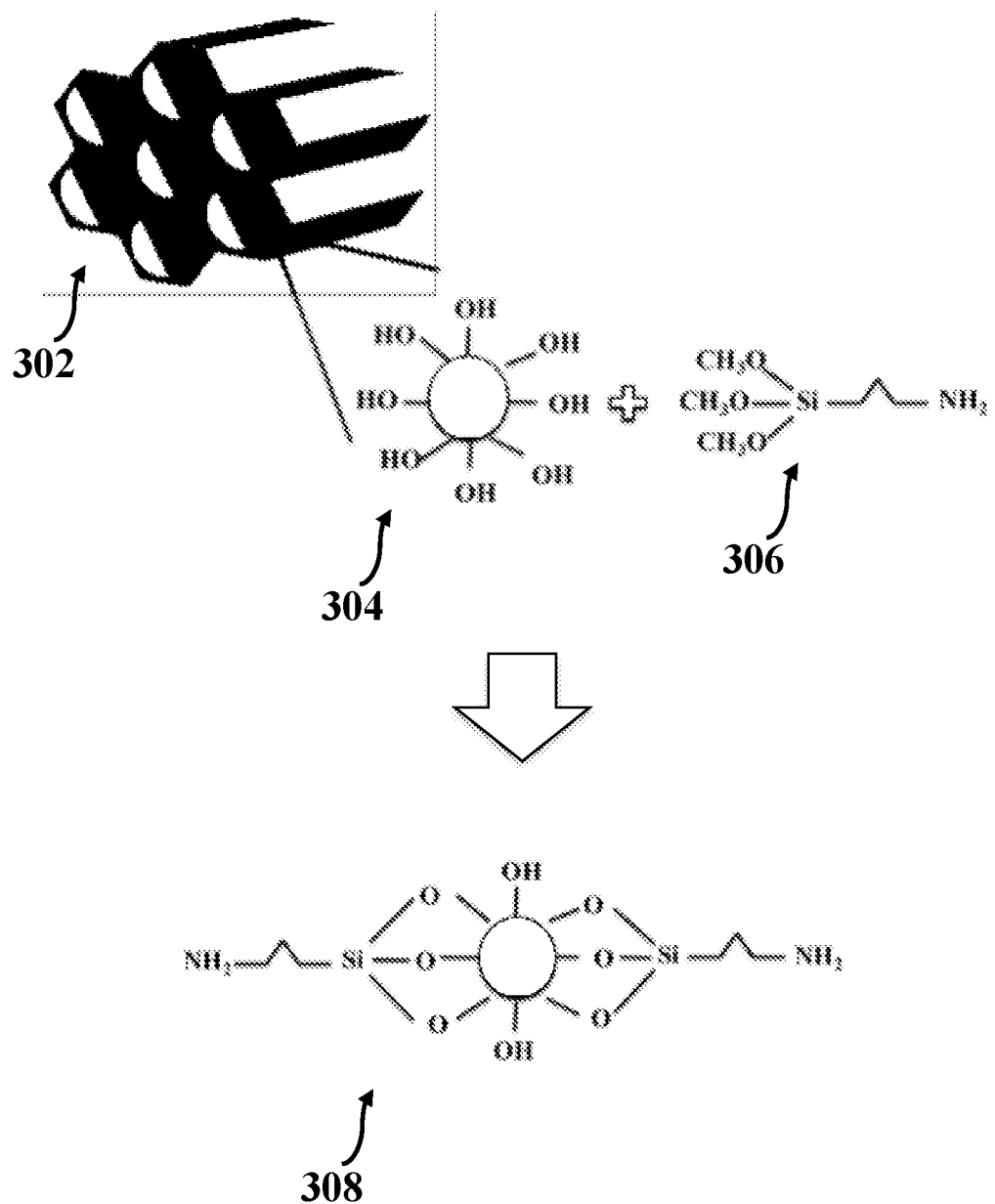
FIG. 3A illustrates a schematic illustration of forming a plurality of first-modified mesoporous silica particles, consistent with one or more exemplary embodiments of the present disclosure.

FIG. 3A shows a schematic illustration of step 204 for forming the plurality of first-modified mesoporous silica particles, consistent with one or more exemplary embodiments of the present disclosure. A mesoporous silica particle 304 of exemplary plurality of mesoporous silica particles 302 may be mixed with a first modifying agent 306; thereby, forming a first-modified mesoporous silica particle 308 that may be functionalized with an amine group.

In an exemplary implementation, step 204 may include forming a mixture by mixing exemplary plurality of mesoporous silica particles 302 with a solution of first modifying agent 306 and stirring the mixture for a time period of about 24 hours or more, which may result in forming a solid material including first-modified mesoporous silica particle 308 within the mixture. First-modified mesoporous silica particle 308 may be separated by filtering the mixture to separate the solid material, washing the separated solid material, and drying the solid material at room temperature.

In an exemplary embodiment, plurality of mesoporous silica particles 302 may include a plurality of SBA-15 particles and first modifying agent 306 may include trimethoxysilylpropyl amine (TMSPA). A plurality of SBA-15 particles may be mixed with a solution of TMSPA in dry toluene that may result in forming SBA-15-TMSPA.

Figure 3B:
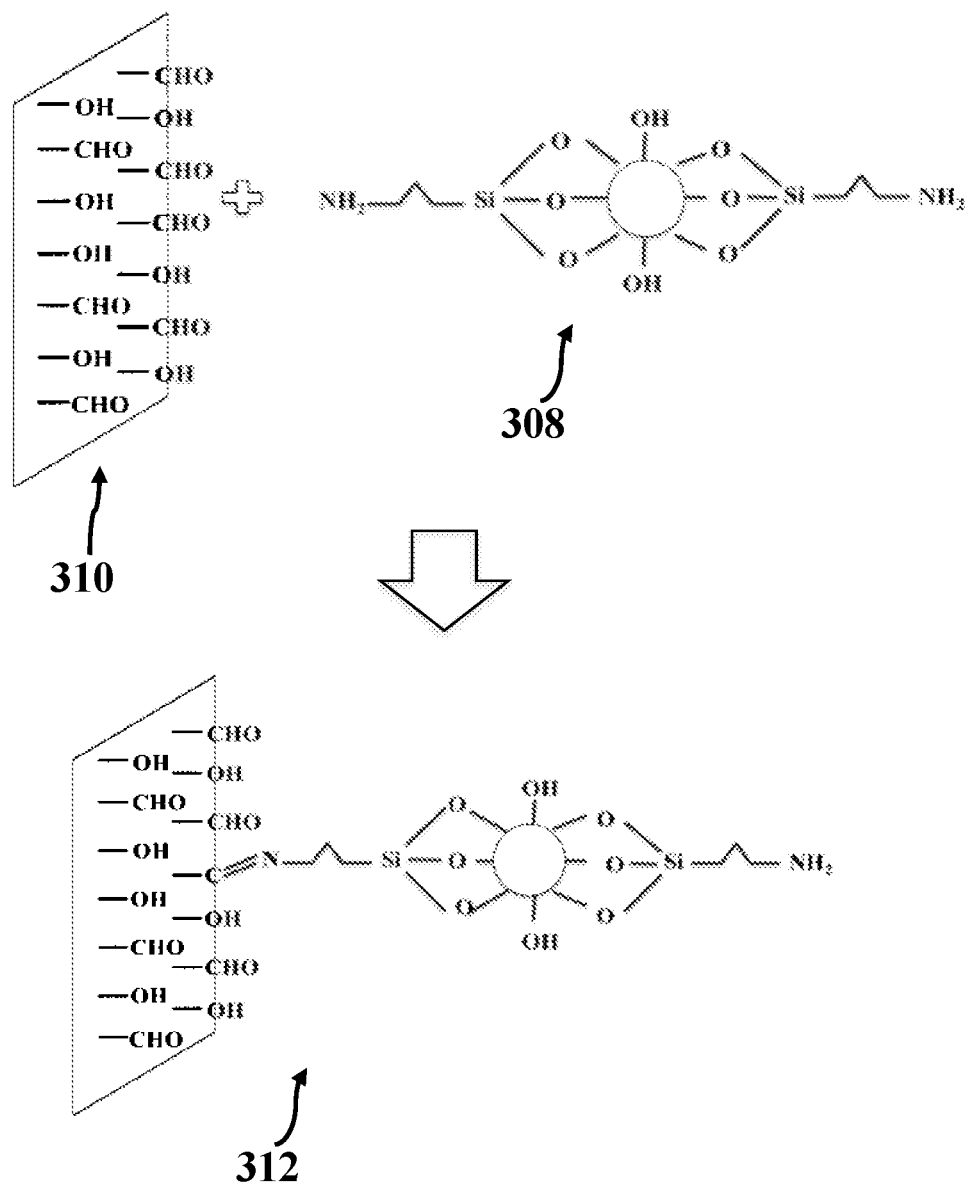
FIG. 3B illustrates a schematic illustration of forming exemplary first-functionalized cotton fabric by attaching a plurality of first-modified mesoporous silica particles into a piece of oxidized cotton fabric, consistent with one or more exemplary embodiments of the present disclosure.

Referring back to FIG. 2A, step 206 may include forming a first-functionalized cotton fabric by attaching a plurality of exemplary first-modified mesoporous silica particles 308 into a piece of oxidized cotton fabric. FIG. 3B shows a schematic illustration of step 206 for forming exemplary first-functionalized cotton fabric 312 by attaching a plurality of exemplary first-modified mesoporous silica particles 308 into an exemplary piece of oxidized cotton fabric 310, consistent with one or more exemplary embodiments of the present disclosure.

Figure 2B:
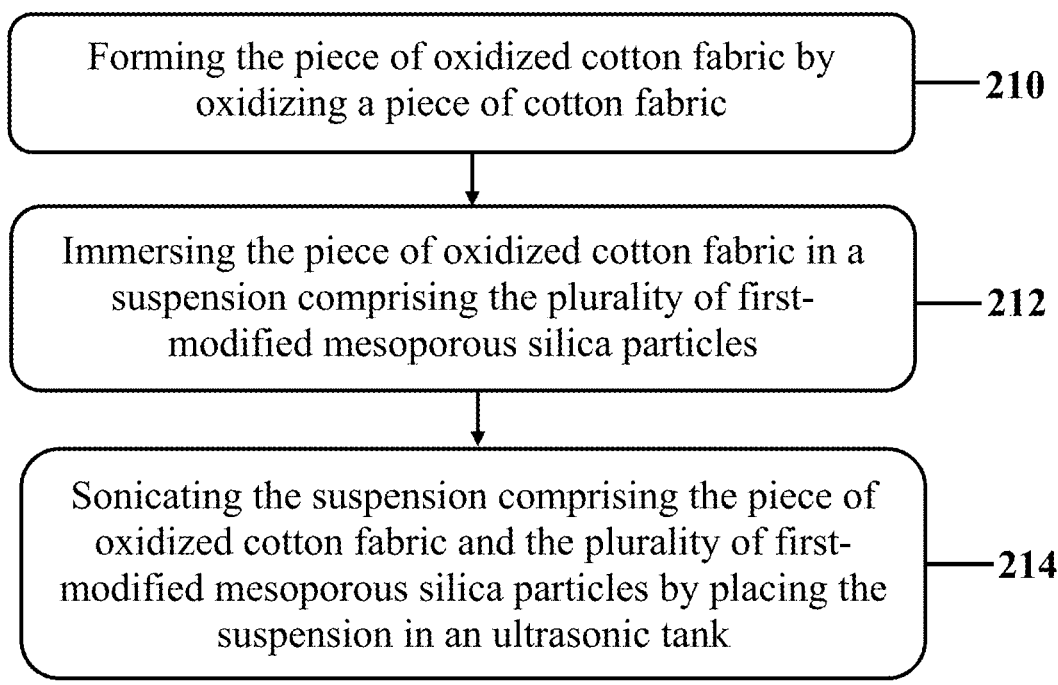
FIG. 2B illustrates an exemplary process for forming a first-functionalized cotton fabric by attaching a plurality of first-modified mesoporous silica particles into a piece of oxidized cotton fabric, consistent with one or more exemplary embodiments of the present disclosure.

FIG. 2B shows an exemplary process for forming exemplary first-functionalized cotton fabric 312 by attaching the plurality of exemplary first-modified mesoporous silica particles 308 into exemplary piece of oxidized cotton fabric 310, consistent with one or more exemplary embodiments of the present disclosure. Forming exemplary first-functionalized cotton fabric 312 may include forming exemplary piece of oxidized cotton fabric 310 by oxidizing a piece of cotton fabric (step 210), immersing exemplary piece of oxidized cotton fabric 310 in a suspension including a plurality of exemplary first-modified mesoporous silica particles 308 (step 212), and sonicating the suspension including exemplary piece of oxidized cotton fabric 310 and the plurality of exemplary first-modified mesoporous silica particles 308 by placing the suspension in an ultrasonic tank (step 214).

In detail, step 210 may include oxidizing a piece of cotton fabric to form exemplary piece of oxidized cotton fabric 310. In an exemplary embodiment, the piece of cotton fabric may be placed in a solution of sodium periodate with a sodium periodate concentration of 4% by weight of the solution for about 3 hours or more that may result in oxidizing hydroxyl group of cellulose in cotton fabric; thereby, forming aldehyde functional groups on pores of a porous matrix of the piece of cotton fabric.

Step 212 may include immersing exemplary piece of oxidized cotton fabric 310 in a suspension including a plurality of exemplary first-modified mesoporous silica particles 308. In an exemplary embodiment, immersing exemplary piece of oxidized cotton fabric 310 in the suspension may include immersing exemplary piece of oxidized cotton fabric 310 in a suspension of SBA-15-TMSPA particles in toluene that may be obtained from step 204. Exemplary SBA-15-TMSPA particles may be used as an example of first-modified mesoporous silica particles 308.

Step 214 may include sonicating the suspension including an exemplary piece of oxidized cotton fabric 310 and the plurality of exemplary first-modified mesoporous silica particles 308 by placing the suspension in an ultrasonic tank for about 4 hours or more.

Figure 3C:
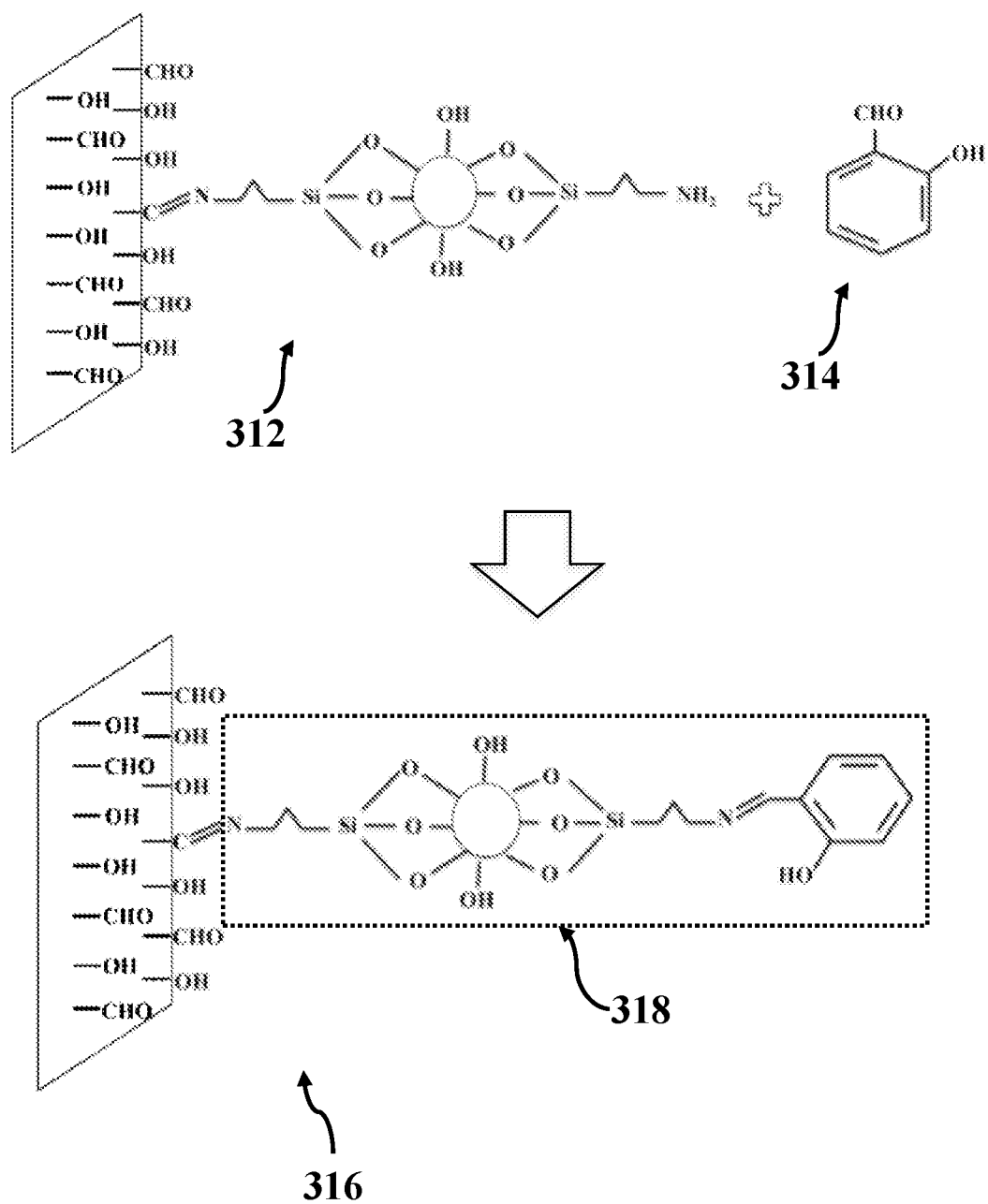
FIG. 3C illustrates a schematic illustration of forming a second-functionalized cotton fabric by reacting a first-functionalized cotton fabric with a second modifying agent responsive to adding the second modifying agent to the first-functionalized cotton fabric, consistent with one or more exemplary embodiments of the present disclosure.

Referring back to FIG. 2A, step 208 may include forming a second-functionalized cotton fabric by adding a second modifying agent to the exemplary first-functionalized cotton fabric 312. FIG. 3C shows a schematic illustration of step 208 for forming exemplary second-functionalized cotton fabric 316 by reacting exemplary first-functionalized cotton fabric 312 with exemplary second modifying agent 314 responsive to adding the second modifying agent 314 to the exemplary first-functionalized cotton fabric 312, consistent with one or more exemplary embodiments of the present disclosure. Exemplary second-functionalized cotton fabric 316 may include exemplary plurality of exemplary modified mesoporous silica particles 318 that may be functionalized with a hydroxyl group and an imine group. Exemplary modified mesoporous silica particles 318 may be incorporated in cotton fabric matrix by chemical bonding to pores of exemplary second-functionalized cotton fabric 316. In an exemplary embodiment, second-functionalized cotton fabric 316 may include SBA-15 particles modified with 2-((3-silylpropylimino) methyl) phenol (SPIMP) that may be chemically stabilized into pores of cotton fabric porous matrix.

In an exemplary implementation, forming exemplary second-functionalized cotton fabric 316 may include placing or immersing exemplary first-functionalized cotton fabric 312 in a solution including exemplary second modifying agent 314 while refluxing the solution for a period of time. In an exemplary embodiment, exemplary second modifying agent 314 may be toluene and 2-hydroxybenzaldehyde (2-HBA). In an exemplary embodiment, the period of time for refluxing the solution may be 24 hours or more.

In an exemplary implementation, exemplary second-functionalized cotton fabric 316 may be used as the solid-phase extraction medium in exemplary method 100. For example, a disk-shaped piece of an exemplary second-functionalized cotton fabric 316 may be used as the solid-phase extraction medium in exemplary method 100.

Referring back to FIG. 1, step 104 may include putting the solid-phase extraction medium in contact with a fluid containing metal ions. In an exemplary implementation, putting the solid-phase extraction medium in contact with the fluid containing metal ions may include a batch process that may be done by immersing the solid-phase extraction medium in the fluid containing metal ions for a period of time less than about 1 hour in order to adsorb metal ions by the solid-phase extraction medium. In an exemplary embodiment, the period of time may be between about 10 minutes and about 15 minutes. In another exemplary implementation, putting the solid-phase extraction medium in contact with the fluid containing metal ions may include a continuous process that may be carried out by passing the fluid containing metal ions through the solid-phase extraction medium via continuously circulating the fluid through the solid-phase extraction medium.

Figure 4:
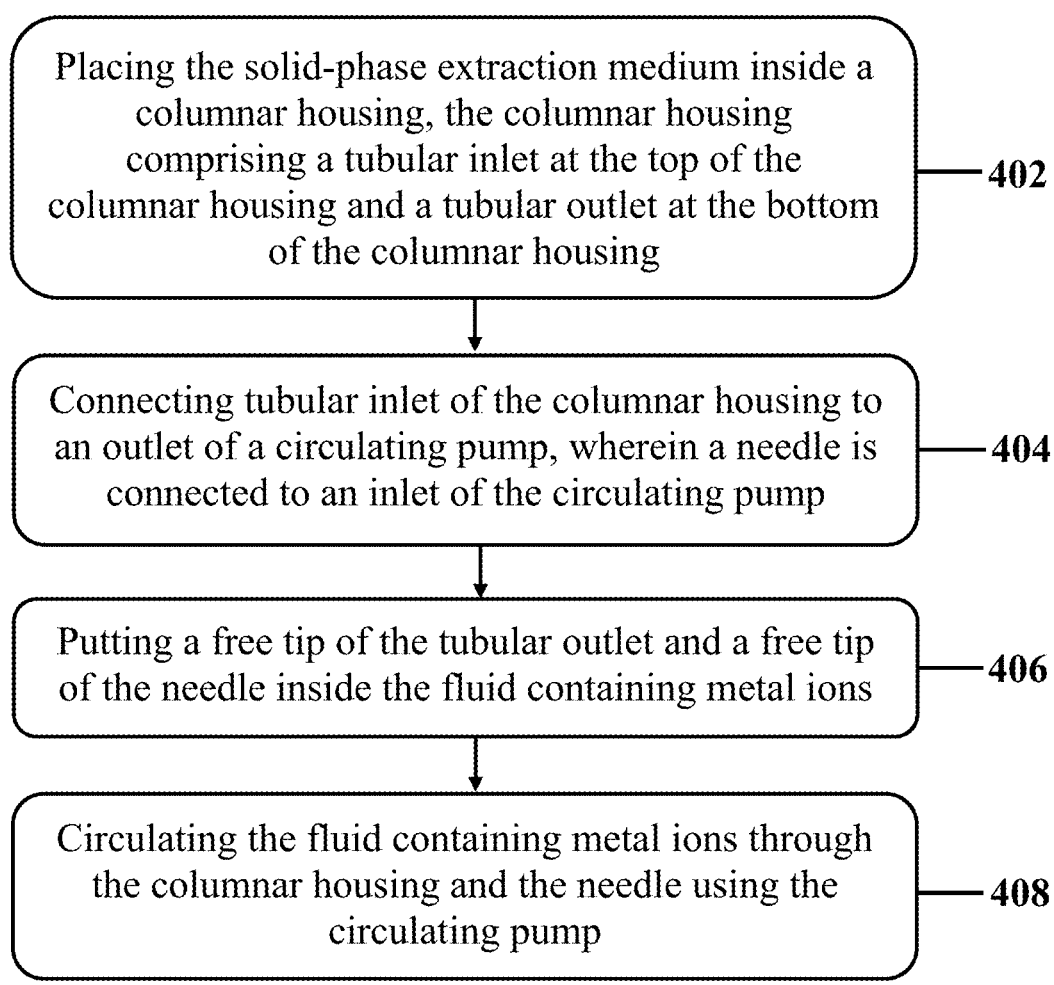
FIG. 4 illustrates an exemplary process for passing the fluid containing metal ions through the solid-phase extraction medium by continuously circulating the fluid through the solid-phase extraction medium, consistent with one or more exemplary embodiments of the present disclosure.

FIG. 4 shows an exemplary process 400 for passing the fluid containing metal ions through the solid-phase extraction medium by continuously circulating the fluid through the solid-phase extraction medium, consistent with one or more exemplary embodiments of the present disclosure. Passing the fluid containing metal ions through the solid-phase extraction medium may include placing the solid-phase extraction medium inside a columnar housing (step 402). Where, the columnar housing may include a tubular inlet at top of the columnar housing and a tubular outlet at bottom of the columnar housing. Exemplary process 400 may further include connecting the tubular inlet of the columnar housing to an outlet of a circulating pump, wherein a needle may be connected to an inlet of the circulating pump (step 404), putting a free tip of the tubular outlet and a free tip of the needle inside the fluid containing metal ions (step 406), and circulating the fluid containing metal ions through the columnar housing and the needle using the circulating pump (step 408).

In detail, step 402 may include placing the solid-phase extraction medium inside a columnar housing; thereby, resulting in forming an exemplary apparatus for solid-phase extraction. Additionally, the apparatus may be used for providing continuous flow of a fluid that may be desired to extract a solid therefrom through the solid-phase extraction medium. For example, the fluid containing metal ions may be passed continuously through the solid-phase extraction medium utilizing exemplary apparatus.

Figure 5A:
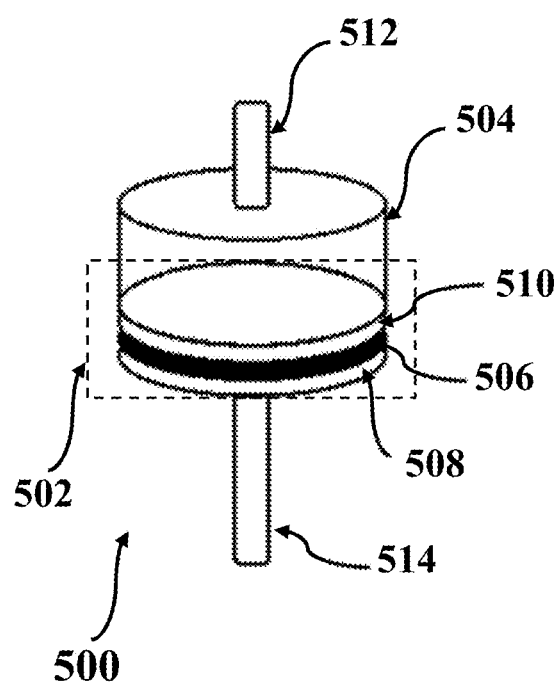
FIG. 5A illustrates a schematic view of an exemplary apparatus for solid-phase extraction, consistent with one or more exemplary embodiments of the present disclosure.

FIG. 5A shows a schematic view of an exemplary apparatus 500 for solid-phase extraction, consistent with one or more exemplary embodiments of the present disclosure. Exemplary apparatus 500 may include an exemplary filter device 502 and an exemplary columnar housing 504. Filter device 502 may be placed inside the columnar housing 504.

In some implementations, filter device 502 may include an exemplary solid-phase extraction medium 506. Filter device 502 may be contained, stored, held, assembled, or otherwise covered by or within columnar housing 504. Columnar housing 504 may include a tubular inlet 512 at top of columnar housing 504 and a tubular outlet 514 at bottom of columnar housing 504. Tubular inlet 512 and tubular outlet 514 may allow for fluid to flow throughout columnar housing 504 across filter device 502.

In some implementations, there may be no housing, or the housing may differ from exemplary columnar housing 504 that shown in FIG. 5A. For example, in some implementations, the filter device 502 may be directly inserted within a syringe. In some implementations, filter device 502 may be used for filtering processes, such as solid-phase extraction process.

In some implementations, exemplary solid-phase extraction medium 502 may include a piece of exemplary second-functionalized cotton fabric 316 with different shapes. For example, exemplary solid-phase extraction medium 502 may include a disk-shaped piece of exemplary second-functionalized cotton fabric 316.

Figure 5B:
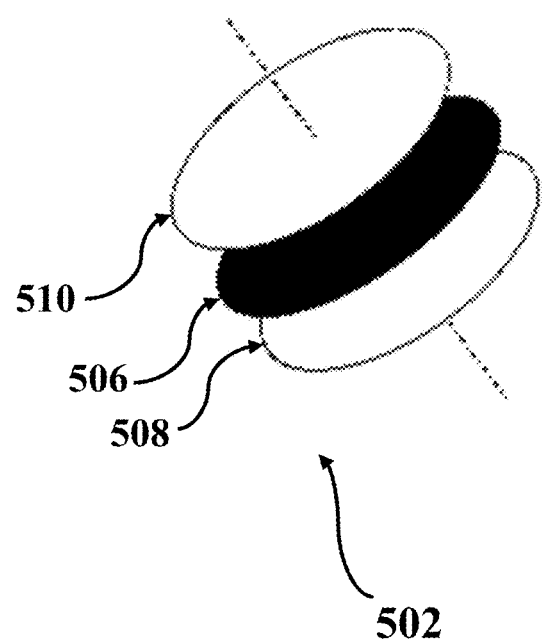
FIG. 5B illustrates a schematic exploded view of an exemplary filter device, consistent with one or more exemplary embodiments of the present disclosure.

FIG. 5B shows a schematic exploded view of filter device 502, consistent with one or more exemplary embodiments of the present disclosure. In some implementations, filter device 502 may further include a supporting member 508 that may include a disc support. In some implementations, the supporting member 508 may include a rigid or inelastic material that may provide support and strength to solid-phase extraction medium 506. In addition, supporting member 508 may include a substantially similar shape, size, or area relative to solid-phase extraction medium 506.

In some implementations, filter device 502 may further include an exemplary pre-filter 510. Pre-filter 510 may be utilized to filter small solid particles from volumes of fluid or highly viscous solutions, and/or to remove large particulates from suspensions; thereby, resulting in preventing a blockage in solid-phase extraction medium 506. Thus, pre-filter 510 may be made of any material that may be configured to act as a filter, such as polypropylene fiber, glass microfiber media, nylon, polyethersulfone (PES), polyvinylidene fluoride (PVDF), polytetrafluoroethylene (PTFE), mixed cellulose (MCE), membrane filtration, and/or other materials that may provide preliminary sample filtration.

In some implementations, pre-filter 510 may be disposable. In other implementations, the pre-filter 510 may be reusable. Furthermore, in some implementations, pre-filter 510 may include a substantially similar shape and size or area relative to solid-phase extraction medium 506. In addition, when the components of filter device 502 may be assembled and/or stacked, pre-filter 510 may be substantially aligned with solid-phase extraction medium 506. In one implementation, a lower surface of pre-filter 510 may directly face, contact and/or be disposed flat or flush against an upper surface of solid-phase extraction medium 506. In still other implementations, an additional material may be positioned between pre-filter 510 and solid-phase extraction medium 506 to facilitate the secure placement of the components, and/or to promote improved filtering.

Furthermore, when the components of filter device 502 may be assembled and/or stacked, supporting member 508 may be substantially aligned with solid-phase extraction medium 506. In one implementation, a lower surface of solid-phase extraction medium 506 may directly face, contact and/or be disposed flat or flush against an upper surface of supporting member 508. Thus, in some cases, supporting member 508 may be disposed directly beneath the solid-phase extraction medium 506, while pre-filter 510 is disposed directly above the solid-phase extraction medium 506, providing a kind of "sandwiched" system. However, it should be understood that in other implementations, filter device 502 may not include a disc support, or there may be an additional material layer between solid-phase extraction medium 506 and supporting member 508 to facilitate secure placement of the components, to improve the fit of the components in the system, and/or to improve the filtering process.

Figure 6:
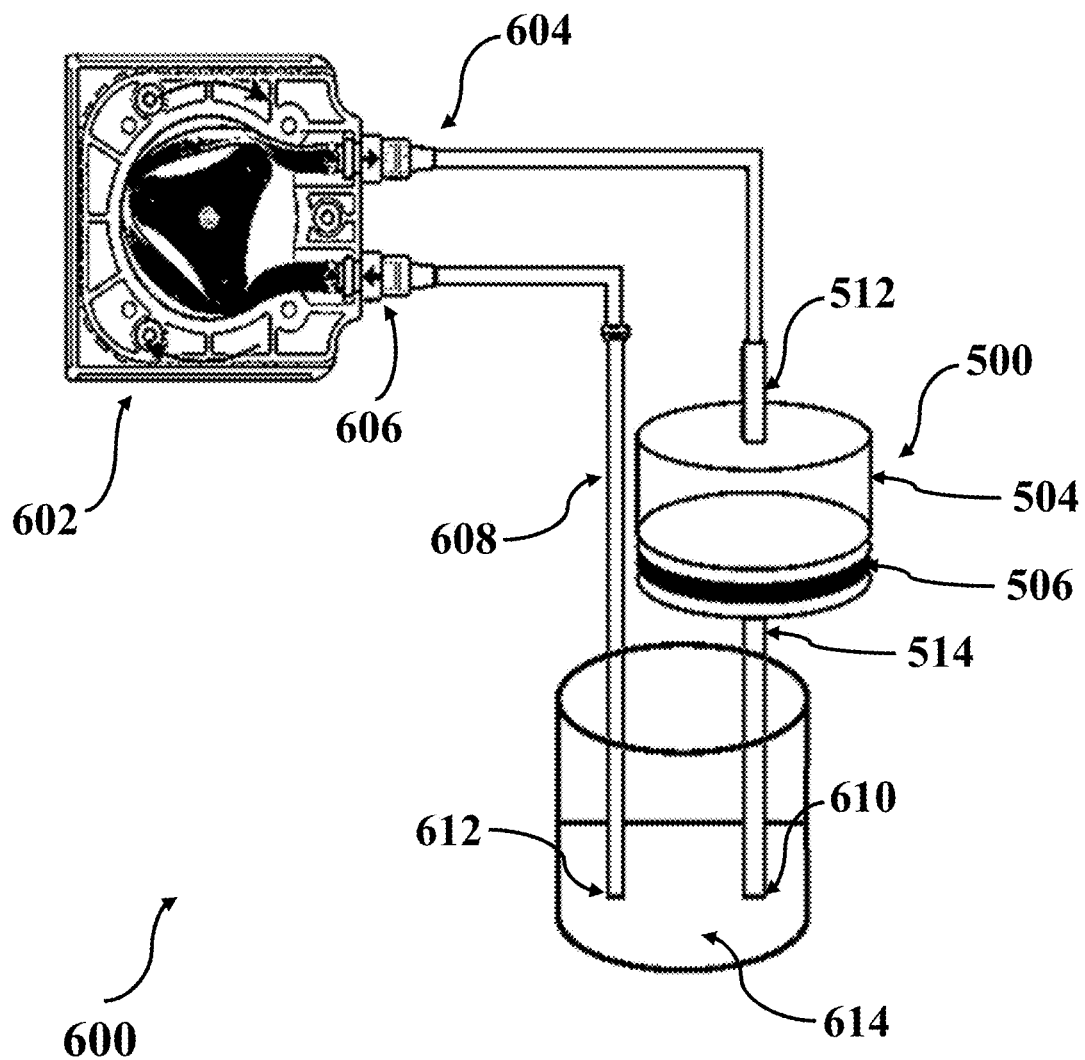
FIG. 6 illustrates a schematic implementation of an exemplary solid-phase extraction system, consistent with one or more exemplary embodiments of the present disclosure.

Referring back to FIG. 4, a solid-phase extraction system may be assembled by conducting exemplary method 400 through steps 402 to 406. FIG. 6 shows a schematic implementation of an exemplary solid-phase extraction system 600, consistent with one or more exemplary embodiments of the present disclosure.

Step 404 may include connecting tubular inlet 512 of columnar housing 504 to an outlet 604 of a circulating pump 602 and a needle 608 may be connected to an inlet 606 of the circulating pump 602. In an exemplary embodiment, circulating pump 602 may be a peristaltic pump. In an exemplary embodiment, needle 608 may include a stainless-steel needle. In an exemplary implementation, a fluid 614 including a pre-conditioning solvent or a sample solution, such as the fluid containing metal ions may be circulated through circulating pump 602, apparatus 500, and needle 608.

Step 406 may include putting free tip 610 of the tubular outlet 514 and free tip 612 of needle 608 inside the fluid 614 that may contain metal ions, such as heavy metal ions. Exemplary fluid 614 may be a fluid sample including one of Iron (Fe), Copper (Cu), Zinc (Zn), Cobalt (Co), Chromium (Cr), Nickel (Ni), and combinations thereof.

Step 408 may include circulating fluid 614 containing metal ions through columnar housing 504 and needle 608 using circulating pump 602. So, solid-phase extraction may be carried out dynamically by continuously passing fluid 614 containing metal ions through across solid-phase extraction medium 506 that may be encased inside columnar housing 504. Circulation of fluid 614 containing metal ions may be simply done by turning circulating pump 602 on. In an exemplary implementation, circulating fluid 614 containing metal ions through columnar housing 504 and needle 608 using circulating pump 602 may include sucking fluid 614 through needle 608 utilizing circulating pump 602, and pumping fluid 614 into tubular inlet 512 of columnar housing 504 utilizing circulating pump 602.

Referring back to FIG. 1, step 106 may include extracting metal ions from fluid 614 by adsorbing the metal ions onto solid-phase extraction medium 506 due to contact between solid-phase extraction medium 506 and fluid 614 containing metal ions. Heavy metals ions, that may be examples of metal ions, may be adsorbed onto second-functionalized cotton fabric 316 which may be an exemplary solid-phase extraction medium 506.

Step 108 may include separating the metal ions from solid-phase extraction medium 506. In an exemplary implementation, separating the metal ions from solid-phase extraction medium 506 may include dissolving the metal ions in an eluting agent by passing the eluting agent through solid-phase extraction medium 506. In an exemplary embodiment, the eluting agent may include an acidic solvent for washing out metals from solid-phase extraction medium 506. In an exemplary embodiment, the eluting agent may include one of $H_2SO_4$, $H_3PO_4$, HCl, $HNO_3$, or combinations thereof.

Figure 7:
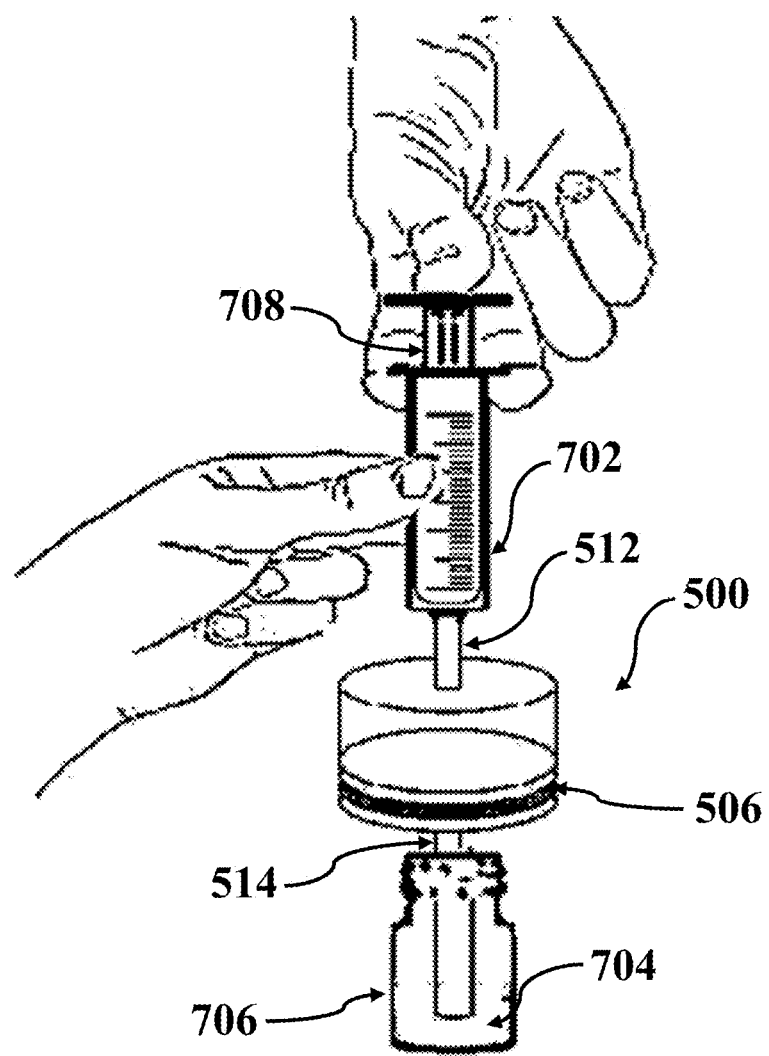
FIG. 7 illustrates a schematic implementation of separating the metal ions from an exemplary solid-phase extraction medium, consistent with one or more exemplary embodiments of the present disclosure.

FIG. 7 shows a schematic implementation of separating the metal ions from solid-phase extraction medium 506, consistent with one or more exemplary embodiments of the present disclosure. In an exemplary implementation, apparatus 500 may be separated from solid-phase extraction system 600. Then, apparatus 500 may be connected to a syringe 702 and a free tip of apparatus 500 may be placed inside a small container 706 containing exemplary eluting agent 704. Subsequently, the metal ions may be washed out from solid-phase extraction medium 506 by eluting agent 704 by sweep movements of syringe 702. The washed out metal ions may be dissolved in the eluting agent 704.

In an exemplary implementation, a tip of syringe 702 may be entered inside tubular inlet 512 and tubular outlet 514 may be placed inside eluting agent 704 in the small container 706. Then, by moving syringe piston 708 upward and downward, eluting agent 704 may be entered to apparatus 500 solid-phase extraction medium 506, and exit from apparatus 500 across solid-phase extraction medium 506, respectively. Therefore, the metal ions may be washed out from solid-phase extraction medium 506 by repeating such sweeping movements of syringe piston 708 upward and downward.

Step 110 may include measuring the amount of the metal ions dissolved in exemplary eluting agent 704. The amount of metal ions in eluting agent 704 may be measured by analyzing eluting agent 704, which may include washed out metal ions from step 108, using a spectrometry method, such as graphite furnace atomic absorption spectrophotometer.

EXAMPLE 1

Fabrication of Modified Cotton Fabric with SBA-15-SPIMP as a SPE Disk for Heavy Metals Extraction In this example, several pieces of cotton fabric were functionalized with modified SBA-15 particles utilizing exemplary methods described above with respect to method 100. SBA-15 mesoporous silica was modified with 2-((3-silylpropylimino) methyl) phenol (SPIMP).

Firstly, SBA-15 was synthesized using hydrothermal method. SBA-15 was obtained as a powder with white coloring. During the synthesis process, about 2 gr of pluronic surfactant (P123) was dissolved in distilled water. The role of P123 is the six-sided formation of mesoporous SBA-15. To create Si—OH groups, tetraethyl orthosilicate (TEOS) was added to the solution to obtain a white gel. The resulting gel was then placed in a high temperature steel reactor to carry out the hydrolysis and to make silica dense. The precipitate was then washed and dried at room temperature. Then, in order to remove organic compounds, the sediment was calcinated at an extremely high temperature in an electric furnace. Then, about 5 g of SBA-15 was mixed with about 3.0 mL of trimethoxysilylpropyl amine (TMSPA) in dry toluene (about 20 mL) and stirred for about 24 hours which may lead to the formation of a solid material (SBA-15-TMSPA). Then, the mixture was filtered, washed with distilled water and dried at room temperature to obtain SBA-15-TMSPA. Thereafter, an exemplary first-functionalized cotton fabric was formed by adding the as-prepared SBA-15-TMSPA to a piece of cotton fabric by placing an oxidized piece of cotton fabric in a suspension of SBA-15-TMSPA and sonicating the solution. Subsequently, exemplary second-functionalized cotton fabric was formed by placing the first-functionalized cotton fabric in a solution including about 3.0 mL of 2-hydroxybenzaldehyde (2-HBA) in toluene, and refluxing the solution for about 24 hours.

Figure 8:
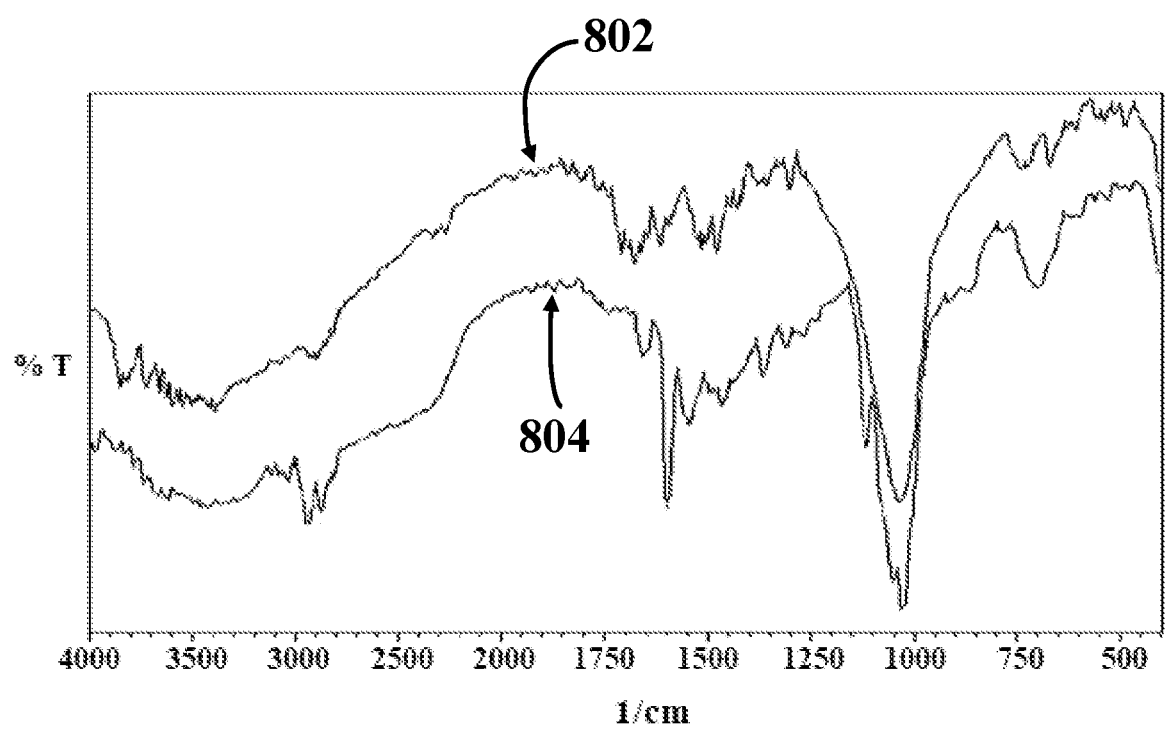
FIG. 8 illustrates Fourier-transform infrared spectroscopy (FT-IR) analysis of untreated cotton fabric and cotton fabric modified with mesoporous SBA-15-SPIMP, consistent with one or more exemplary embodiments of the present disclosure.

FIG. 8 shows Fourier-transform infrared spectroscopy (FT-IR) analysis of untreated cotton fabric (graph 802) and cotton fabric modified with mesoporous SBA-15-SPIMP (graph 804), consistent with one or more exemplary embodiments of the present disclosure. By comparing FT-IRs for untreated cotton fabric 802 and cotton fabric modified with mesoporous SBA-15-SPIMP 804, it may be understood that chemical bonding has occurred between the SBA-15-SPIMP and cotton as a result of step 102 of exemplary method 100 as described above.

Figure 9A:
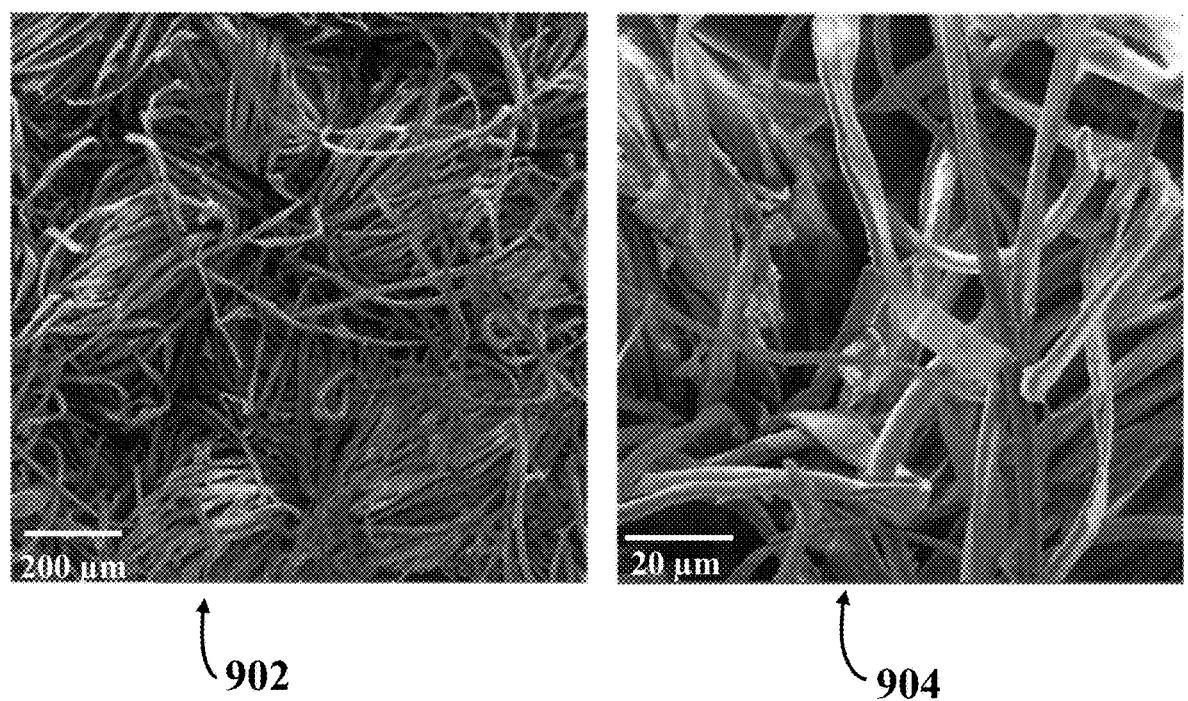
FIG. 9A illustrates scanning electron microscopy (SEM) images of surface of exemplary untreated cotton fabric with magnification levels of approximately 169 x and 2.0 kx, consistent with one or more exemplary embodiments of the present disclosure.
Figure 9B:
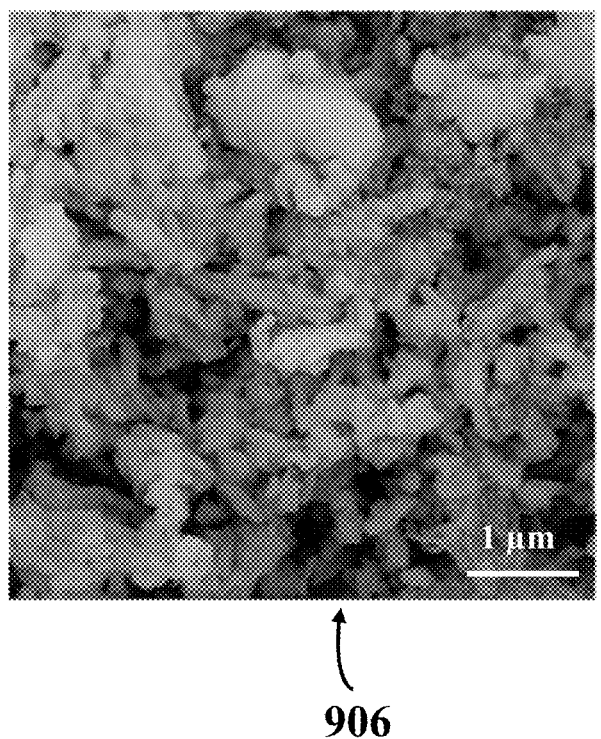
FIG. 9B illustrates a SEM image of surface of exemplary SBA-15-SPIMP with magnification level of approximately 40.0 kx, consistent with one or more exemplary embodiments of the present disclosure.
Figure 9C:
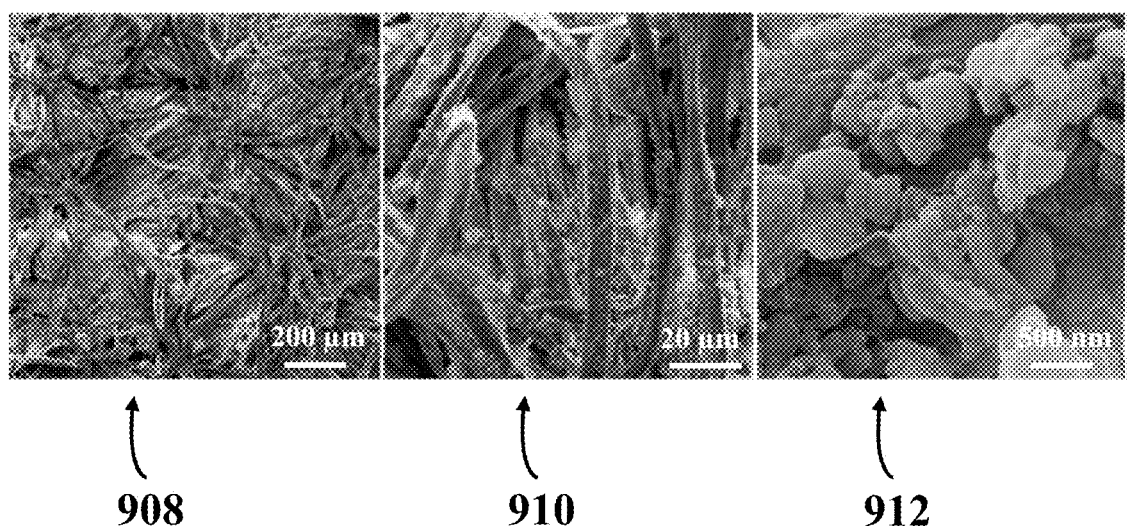
FIG. 9C illustrates scanning electron microscopy (SEM) images of surface of exemplary modified cotton fabric (SBA-15-SPIMP SPE disk) shown at magnified levels of approximately 170 x, 2.0 kx and 75 kx, consistent with one or more exemplary embodiments of the present disclosure.

FIG. 9A shows scanning electron microscopy (SEM) images of surface of exemplary untreated cotton fabric with magnification levels of approximately 169 x (image 902) and 2.0 kx (image 904), consistent with one or more exemplary embodiments of the present disclosure. FIG. 9B shows a SEM image 906 of surface of exemplary SBA-15-SPIMP with magnification level of approximately 40.0 kx, consistent with one or more exemplary embodiments of the present disclosure. FIG. 9C shows scanning electron microscopy (SEM) images of surface of exemplary modified cotton fabric (SBA-15-SPIMP SPE disk) shown at magnified levels of approximately 170 x (image 908), 2.0 kx (image 910) and 75 kx (image 912), consistent with one or more exemplary embodiments of the present disclosure. SEM images shows that SBA-15-SPIMP sorbents are bonded via chemical attractions to cotton fabric. In exemplary embodiment, chemically binding between SBA-15-SPIMP sorbents and the cotton fabric provides an active, porous surface for the trapping and/or extracting of particles such as heavy metals. The SBA-15 has been modified with SPIMP to provide a specialized substance for extraction of heavy metal ions.

EXAMPLE 2

The Effect of pH on the Extraction Efficiency of Heavy Metal Ions

In this example, a 2 ml Polytetrafluoroethylene (PTFE) column was used as a housing similar to columnar housing 504 for disposing exemplary SBA-15-SPIMP SPE disks that were prepared in accordance with EXAMPLE 1. SBA-15-SPIMP SPE disks were placed at the bottom of the PTFE column. Formation of complexes between adsorbent and metal ions may depend on the pH; therefore, optimal pH selection may be necessary for the formation of ligand complexes with these ions. At pH values of 1 to 12, all steps of exemplary method 100 including adsorption, washing and measuring of metal ions were performed as described hereinabove.

Figure 10:
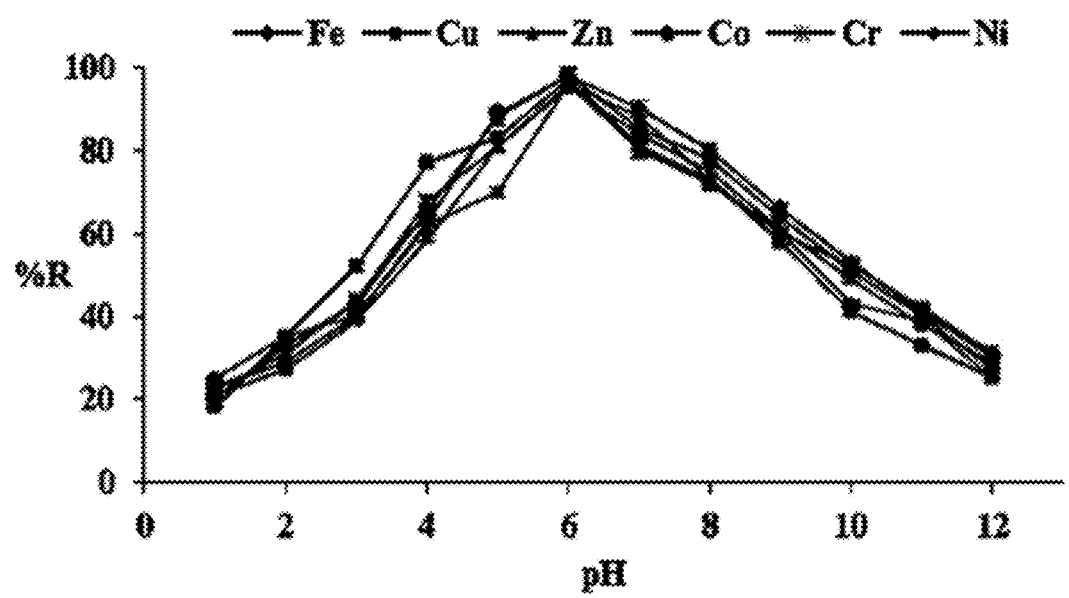
FIG. 10 illustrates the effect of pH of the fluid sample on the extraction efficiency (% R=% metal recovery) of heavy metal ions, consistent with one or more exemplary embodiments of the present disclosure.

FIG. 10 shows the effect of pH of the fluid sample on the extraction efficiency (% R=% metal recovery) of heavy metal ions, consistent with one or more exemplary embodiments of the present disclosure. According to the results, it is shown that absorption of these ions at pH=6 is the maximum. At a pH below 6, due to the presence of hydroxyl groups and nitrogen atoms in the adsorbent structure, the adsorbent appears to be protonated decreasing the extraction efficiency. On the other hand, at a pH higher than 6, the recovery is reduced due to the formation of hydroxide deposits of metal ions or hydroxide mixture complexes, and insoluble species.

EXAMPLE 3

Comparison Between SPE Efficiency of SBA-15-SPIMP SPE Disk and Commercial SPE Disks In this example, the extraction performance of several commercial SPE disks, such as Octadecyl silica bonded SPE disk, Chelating SPE disk, Cation Exchange-SR SPE disk and SDB-XC (poly(styrenedivinylbenzene)) SPE disk for extraction of six heavy metals, including Iron (Fe), Copper (Cu), Zinc (Zn), Cobalt (Co), Chromium (Cr), and Nickel (Ni) was compared with the extraction performance of exemplary SBA-15-SPIMP SPE disks that was prepared in accordance with EXAMPLE 1. The six metal ions were selected in order to provide a diverse range across the spectrum of heavy metal for testing.

Figure 11:
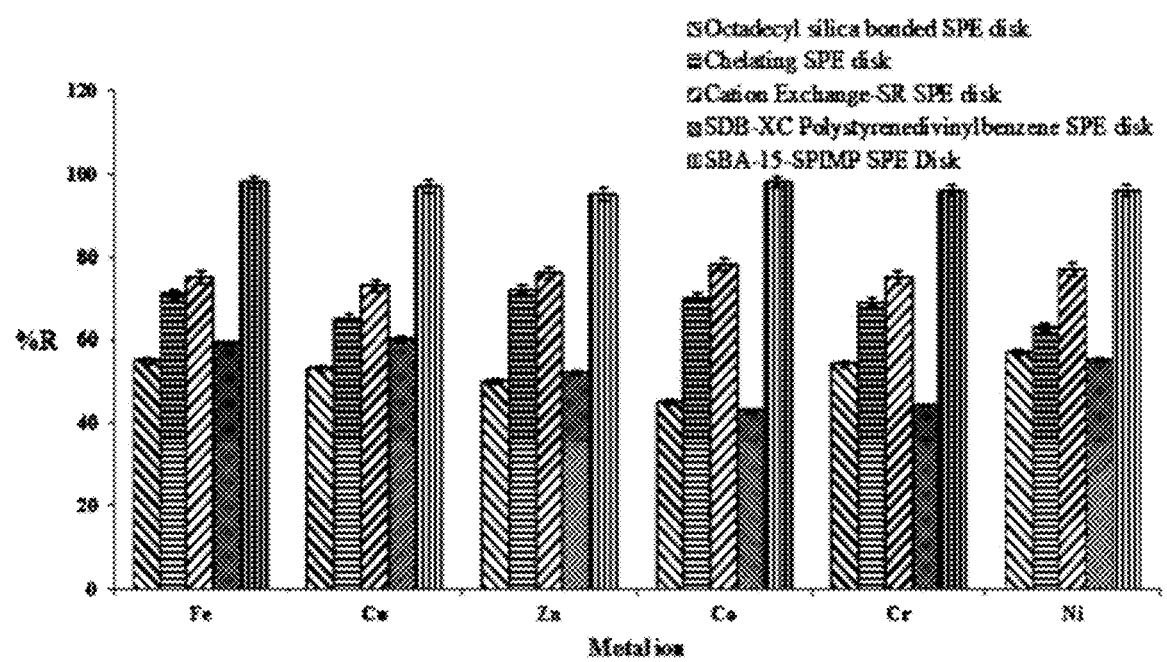
FIG. 11 illustrates the effectiveness of exemplary SBA-15-SPIMP modified SPE disk compared with various commercial SPE disks, consistent with one or more exemplary embodiments of the present disclosure.

FIG. 11 shows the effectiveness of exemplary SBA-15-SPIMP modified SPE disk compared with various commercial SPE disks, consistent with one or more exemplary embodiments of the present disclosure. It may be clearly seen that for each of the six metal ions, the SBA-15-SPIMP SPE disk extraction rate was significantly greater than others.

EXAMPLE 4

Solid-Phase Extraction of Heavy Metals Using Fabricated SBA-15-SPIMP SPE Disk

In order to increase the extraction efficiency of exemplary SBA-15-SPIMP SPE disk, the effective parameters on the extraction such as sample flow rate, sample volume, sample pH, type and volume of the eluting solvent (agent) and flow velocity were studied and optimized. Under optimum conditions, limits of detection (LODs) for six studied heavy metals were in the range of about 0.15-1.5 $ng \cdot ml^{-1}$. Linear dynamic ranges (LDRs) for the calibration curves were found to be over the range of about 0.001-200 $\mu g \cdot ml^{-1}$. Relative standard deviations (RSDs %) for six replicated analysis of about 1 $\mu g \cdot l^{-1}$ of analytes were obtained between about 2.0% and about 3.7%. Exemplary prepared SBA-15-SPIMP SPE disk was used for extraction and measurement of heavy metals in various samples such as water, vegetables and meat. The result of extraction and quantification of heavy metals in beef, fish meat and spinach are shown in TABLEs. 1, 2 and 3, respectively.

TABLE 1

The result of extraction and quantification of heavy metals in beef.

| Ion | Added (µg g$^{-1}$) | Found (µg g$^{-1}$) | % RSD | % R |
|---|---|---|---|---|
| Fe | 0 | 135.8 | 3.1 | — |
|    | 10 | 145.6 | 2.4 | 98 |
| Cu | 0 | 11.4 | 2.5 | — |
|    | 10 | 21.6 | 2.3 | 102 |
| Zn | 0 | 25.6 | 2.2 | — |
|    | 10 | 34.8 | 2.6 | 97 |
| Co | 0 | 1.3 | 2.3 | — |
|    | 10 | 10.9 | 3.0 | 96 |
| Cr | 0 | 10.2 | 2.3 | — |
|    | 10 | 20.3 | 2.2 | 101 |
| Ni | 0 | 3.7 | 3.4 | — |
|    | 10 | 13.5 | 2.5 | 98 |

TABLE 2

The result of extraction and quantification of heavy metals in fish meat.

| Ion | Added (µg g$^{-1}$) | Found (µg g$^{-1}$) | % RSD | % R |
|---|---|---|---|---|
| Fe | 0 | 62.6 | 3.0 | — |
|    | 10 | 72.2 | 2.9 | 96 |
| Cu | 0 | 12.1 | 2.2 | — |
|    | 10 | 22.5 | 2.7 | 104 |
| Zn | 0 | 14.7 | 2.4 | — |
|    | 10 | 24.9 | 3.1 | 102 |
| Co | 0 | 1.1 | 3.7 | — |
|    | 10 | 10.9 | 3.2 | 98 |
| Cr | 0 | 10.1 | 2.4 | — |
|    | 10 | 19.8 | 2.1 | 97 |
| Ni | 0 | 0.6 | 3.0 | — |
|    | 10 | 10.5 | 2.2 | 99 |

TABLE 3

The result of extraction and quantification of heavy metals in spinach.

| Ion | Added (µg g$^{-1}$) | Found (µg g$^{-1}$) | % RSD | % R |
|---|---|---|---|---|
| Fe | 0 | 57.3 | 3.3 | — |
|    | 10 | 67.6 | 2.2 | 103 |
| Cu | 0 | 2.5 | 2.8 | — |
|    | 10 | 12.1 | 3.1 | 96 |
| Zn | 0 | 1.2 | 2.1 | — |
|    | 10 | 11.0 | 2.0 | 98 |
| Co | 0 | 0.2 | 3.3 | — |
|    | 10 | 9.9 | 3.0 | 97 |
| Cr | 0 | 2.3 | 2.4 | — |
|    | 10 | 12.4 | 2.2 | 101 |
| Ni | 0 | 0.3 | 3.5 | — |
|    | 10 | 10.5 | 2.3 | 102 |

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for solid-phase extraction, comprising:
fabricating a solid-phase extraction medium by incorporating a plurality of modified mesoporous silica particles within pores of a cotton fabric matrix, fabricating the solid-phase extraction medium comprising attaching a plurality of mesoporous silica particles modified with a hydroxyl group and an imine group into the cotton fabric matrix comprising a porous matrix;
putting the solid-phase extraction medium in contact with a fluid containing metal ions, comprising one of:
immersing the solid-phase extraction medium in the fluid containing metal ions; and
passing the fluid containing metal ions through the solid-phase extraction medium by continuously circulating the fluid through the solid-phase extraction medium; and
extracting the metal ions from the fluid by adsorbing the metal ions onto the solid-phase extraction medium responsive to the contact between the solid-phase extraction medium and the fluid containing metal ions.

2. The method of claim 1, wherein attaching the plurality of mesoporous silica particles modified with the hydroxyl group and the imine group into the cotton fabric matrix comprises chemically bonding of the plurality of mesoporous silica particles modified with the hydroxyl group and the imine group into pores of the porous matrix.

3. The method of claim 1, wherein fabricating the solid-phase extraction medium by incorporating the plurality of modified mesoporous silica particles within pores of the cotton fabric matrix comprises:
synthesizing a plurality of mesoporous silica particles;
forming a plurality of first-modified mesoporous silica particles by functionalizing the plurality of mesoporous silica particles with an amine group using a first modifying agent;
forming a first-functionalized cotton fabric by attaching the plurality of first-modified mesoporous silica particles into a piece of oxidized cotton fabric; and
forming a second-functionalized cotton fabric by adding a second modifying agent to the first-functionalized cotton fabric.

4. The method of claim 3, wherein synthesizing the plurality of mesoporous silica particles comprises synthesizing the plurality of mesoporous silica particles using by:
forming a solution by dissolving pluronic acid in distilled water;
forming a white gel by adding tetraethyl orthosilicate (TEOS) to the solution;
forming a precipitate by hydrolyzing the white gel, comprising:
placing the white gel in a steel reactor; and
heating the steel reactor;
washing the precipitate with distilled water;
drying the washed precipitate at room temperature; and
removing organic compounds of the dried precipitate by calcinating the dried precipitate in an electric furnace.

5. The method of claim 3, wherein forming the plurality of first-modified mesoporous silica particles comprises:
forming a mixture by mixing the plurality of mesoporous silica particles with a solution of the first modifying agent;
forming a solid material in the mixture by stirring the mixture for a time period of 24 hours or more, the solid material comprising the first-modified mesoporous silica particle;
separating the solid material from the mixture by filtering the mixture;
washing the separated solid material; and
drying the washed solid material.

6. The method of claim 3, wherein forming the first-functionalized cotton fabric comprises attaching the plurality of first-modified mesoporous silica particles into the piece of oxidized cotton fabric and the steps of:
forming the piece of oxidized cotton fabric by oxidizing a piece of cotton fabric;
immersing the piece of oxidized cotton fabric in a suspension comprising the plurality of first-modified mesoporous silica particles; and
sonicating the suspension comprising the piece of oxidized cotton fabric and the plurality of first-modified mesoporous silica particles by placing the suspension in an ultrasonic tank.

7. The method of claim 3, wherein forming the second-functionalized cotton fabric by adding the second modifying agent to the first-functionalized cotton fabric comprises immersing the first-functionalized cotton fabric in a solution of the second modifying agent for at least 24 hours.

8. The method of claim 1, further comprising:
separating the metal ions from the solid-phase extraction medium, comprising dissolving the metal ions in an eluting agent by passing the eluting agent through the solid-phase extraction medium.

9. The method of claim 8, further comprising:
measuring an amount of the metal ions by analyzing the eluting agent using a graphite furnace atomic absorption spectrophotometer.

10. The method of claim 1, wherein the metal ions comprise at least one of Iron (Fe), Copper (Cu), Zinc (Zn), Cobalt (Co), Chromium (Cr), Nickel (Ni), and combinations thereof.

11. A method for solid-phase extraction, comprising:
fabricating a solid-phase extraction medium by incorporating a plurality of modified mesoporous silica particles within pores of a cotton fabric matrix;
putting the solid-phase extraction medium in contact with a fluid containing metal ions, comprising passing the fluid containing metal ions through the solid-phase extraction medium by continuously circulating the fluid through the solid-phase extraction medium, comprising:
placing the solid-phase extraction medium inside a columnar housing comprising a tubular inlet at top of the columnar housing and a tubular outlet at bottom of the columnar housing;
connecting the tubular inlet of the columnar housing to an outlet of a circulating pump, wherein a needle is connected to an inlet of the circulating pump;
putting a free tip of the tubular outlet and a free tip of the needle inside the fluid containing metal ions; and
circulating the fluid containing metal ions through the columnar housing and the needle using the circulating pump; and
extracting the metal ions from the fluid by adsorbing the metal ions onto the solid-phase extraction medium responsive to the contact between the solid-phase extraction medium and the fluid containing metal ions.

12. The method of claim 11, wherein circulating the fluid containing metal ions through the columnar housing and the needle using the circulating pump comprises:
    sucking the fluid containing metal ions through needle utilizing the circulating pump; and
    pumping the fluid containing metal ions into the tubular inlet of the columnar housing utilizing the circulating pump.

\* \* \* \* \*